US00RE42045E

(19) United States
(12) Reissued Patent
Hong et al.

(10) Patent Number: US RE42,045 E
(45) Date of Reissued Patent: Jan. 18, 2011

(54) FILTERING CONTROL METHOD FOR IMPROVING IMAGE QUALITY OF BI-LINEAR INTERPOLATED IMAGE

(75) Inventors: Min-Cheol Hong, Seoul (KR); Yoon-Seong Soh, Seoul (KR)

(73) Assignee: LG Electronics Inc., Seoul (KR)

(21) Appl. No.: 11/546,484

(22) Filed: Oct. 12, 2006

Related U.S. Patent Documents

Reissue of:
(64) Patent No.: 6,803,954
Issued: Oct. 12, 2004
Appl. No.: 09/692,156
Filed: Oct. 20, 2000

(30) Foreign Application Priority Data

Oct. 21, 1999 (KR) ..... 1999/45805

(51) Int. Cl.
*G06K 9/40* (2006.01)

(52) U.S. Cl. ..... 382/260; 382/261; 382/262; 382/263; 382/264

(58) Field of Classification Search ..... 382/260–264, 382/298–300; 358/525; 345/3.3, 698; 348/260
See application file for complete search history.

(56) References Cited

U.S. PATENT DOCUMENTS 4,550,437 A 10/1985 Kobayashi et al.
5,208,872 A 5/1993 Fisher
5,274,469 A 12/1993 Small et al.
5,696,848 A 12/1997 Patti et al.
5,821,915 A 10/1998 Graham et al.
5,875,268 A 2/1999 Miyake
5,880,767 A 3/1999 Liu
5,917,963 A 6/1999 Miyake
5,949,914 A 9/1999 Yuen
5,991,464 A 11/1999 Hsu et al.
6,058,248 A 5/2000 Atkins et al.
6,072,907 A 6/2000 Taylor et al.
6,075,926 A 6/2000 Atkins et al.
6,236,433 B1 5/2001 Acharya et al.
6,263,120 B1 7/2001 Matsuoka
6,285,804 B1 9/2001 Crinon et al.
6,331,902 B1 12/2001 Lin
6,567,568 B1 5/2003 Nabeshima et al.
6,912,004 B1 6/2005 Knudsen et al.

OTHER PUBLICATIONS

Office Action for U.S. Appl. No. 12/024,408, mailed Jun. 29, 2009, 7 pages.
Office Action for U.S. Appl. No. 12/024,408, mailed Dec. 4, 2008, 10 pages.

*Primary Examiner*—Brian Q Le
(74) *Attorney, Agent, or Firm*—Fish & Richardson P.C.

(57) ABSTRACT

The present invention relates to an interpolation method for enlarging a digital image or predicting a moving vector of a compressed image system as a sub-pixel unit when the image digitized through a CCD (Charge Coupled Device) camera ect. has a low resolution in a video phone or video conference or general digital video system, particularly the present invention can be adapted to a post processor of a compressed digital image in order to improve the image quality, and can be used for finding a moving vector of a moving picture compressed type, accordingly the present invention is capable of improving the image quality.

19 Claims, 4 Drawing Sheets

$$
\begin{bmatrix} A \\ B \\ C \\ D \\ E \\ F \\ G \\ H \\ I \\ J \\ K \\ L \\ M \\ N \\ O \\ P \\ Q \\ R \\ S \\ T \\ U \\ V \\ W \\ X \end{bmatrix}
=1/512
\begin{bmatrix}
-7 & 81 & -14 & 0 & 52 & 405 & 24 & 0 & -13 & -2 & -14 & 0 & 0 & 0 & 0 & 0 \\
-6 & 23 & 52 & -12 & -9 & 201 & 302 & -12 & -3 & -5 & -13 & -6 & 0 & 0 & 0 & 0 \\
-8 & 43 & -16 & 0 & 99 & 382 & -9 & 0 & -3 & 38 & -14 & 0 & 0 & 0 & 0 & 0 \\
-10 & 38 & -20 & 0 & 54 & 397 & 27 & 0 & -7 & 49 & -16 & 0 & 0 & 0 & 0 & 0 \\
-13 & 33 & -23 & 0 & 10 & 413 & 62 & 0 & -12 & 59 & -17 & 0 & 0 & 0 & 0 & 0 \\
-12 & 26 & -15 & -3 & -4 & 354 & 142 & -5 & -11 & 48 & -4 & -4 & 0 & 0 & 0 & 0 \\
-10 & 17 & -8 & -7 & -13 & 295 & 221 & -9 & -10 & 36 & 9 & -9 & 0 & 0 & 0 & 0 \\
-5 & 4 & 18 & -11 & -9 & 197 & 302 & -9 & -5 & 17 & 24 & -11 & 0 & 0 & 0 & 0 \\
-14 & -6 & -21 & 0 & 56 & 338 & 29 & 0 & -2 & 99 & -17 & 0 & 0 & 0 & 0 & 0 \\
-10 & -7 & -24 & -3 & -5 & 344 & 145 & -5 & -12 & 88 & 7 & -6 & 0 & 0 & 0 & 0 \\
-4 & -13 & -16 & -11 & -10 & 194 & 301 & -6 & -6 & 39 & 60 & -16 & 0 & 0 & 0 & 0 \\
-12 & -13 & -9 & 0 & 53 & 363 & 26 & 0 & 1 & 111 & -8 & 0 & 0 & 0 & 0 & 0 \\
-9 & -14 & -11 & 0 & 19 & 356 & 67 & 0 & -6 & 109 & 1 & 0 & 0 & 0 & 0 & 0 \\
-9 & -9 & -14 & -2 & -9 & 261 & 195 & -5 & -9 & 74 & 45 & -6 & 0 & 0 & 0 & 0 \\
-12 & -5 & -13 & -4 & -5 & 174 & 282 & -9 & -5 & 42 & 79 & -12 & 0 & 0 & 0 & 0 \\
-6 & -10 & -8 & 0 & 19 & 219 & 18 & 0 & 37 & 271 & 6 & 0 & -9 & -16 & -9 & 0 \\
-8 & -9 & -6 & 1 & -11 & 193 & 76 & -4 & -7 & 243 & 83 & -4 & -4 & -14 & -14 & -1 \\
-1 & -8 & -11 & -4 & -8 & 102 & 156 & -13 & -8 & 142 & 206 & -10 & -1 & -11 & -15 & -4 \\
-4 & -5 & -3 & 0 & 23 & 153 & -16 & 0 & 83 & 330 & -13 & 0 & -13 & -16 & -7 & 0 \\
-3 & -5 & -4 & 0 & 6 & 151 & 0 & 0 & 45 & 338 & 15 & 0 & -11 & -9 & -11 & 0 \\
-2 & -5 & -5 & 0 & -10 & 149 & 15 & 0 & 7 & 347 & 43 & 0 & -9 & -2 & -16 & 0 \\
-2 & -4 & -6 & -1 & -12 & 125 & 35 & -4 & -5 & 304 & 111 & -4 & -6 & -3 & -14 & -2 \\
-1 & -4 & -6 & -1 & -14 & 102 & 55 & -8 & -16 & 260 & 179 & -9 & -4 & -4 & -13 & -4 \\
-1 & -4 & -6 & -2 & -7 & 62 & 104 & -12 & -8 & 172 & 255 & -11 & -2 & -9 & -14 & -5
\end{bmatrix}
\begin{bmatrix} a \\ b \\ c \\ d \\ e \\ f \\ g \\ h \\ i \\ j \\ k \\ l \\ m \\ n \\ o \\ p \end{bmatrix}
$$

FIG. 1
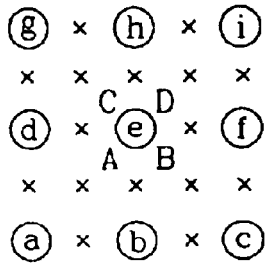
FIG. 2
$$\begin{bmatrix} A \\ B \\ C \\ D \end{bmatrix} = 1/512 \begin{bmatrix} 1 & 94 & -15 & 94 & 391 & -15 & -15 & -15 & -8 \\ -15 & 86 & -9 & -13 & 370 & 113 & -6 & -14 & -18 \\ -15 & -13 & -6 & 86 & 370 & -14 & 9 & 113 & -18 \\ 6 & -14 & -14 & -14 & 349 & 107 & -14 & 107 & 11 \end{bmatrix} \begin{bmatrix} a \\ b \\ c \\ d \\ e \\ f \\ g \\ h \\ i \end{bmatrix}$$
FIG. 3
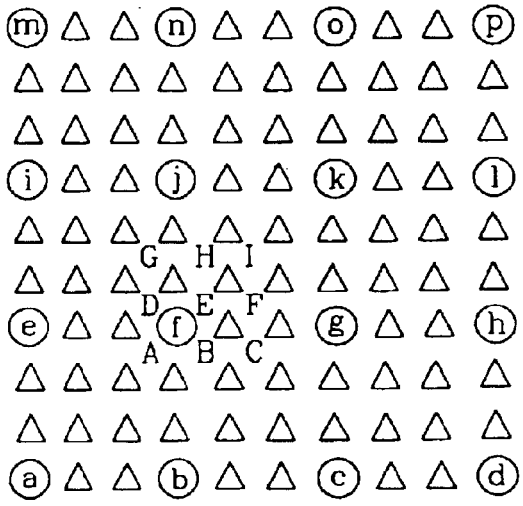

FIG. 4

$$\begin{bmatrix} A \\ B \\ C \\ D \\ E \\ F \\ G \\ H \\ I \end{bmatrix} = 1/512 \begin{bmatrix} -4 & 60 & -22 & 0 & 104 & 387 & -3 & 0 & -4 & 7 & -13 & 0 & 0 & 0 & 0 & 0 \\ -15 & 71 & -22 & 0 & 11 & 422 & 63 & 0 & -11 & 12 & -19 & 0 & 0 & 0 & 0 & 0 \\ -12 & 44 & 9 & -8 & -17 & 307 & 215 & -8 & -6 & 4 & -11 & -5 & 0 & 0 & 0 & 0 \\ -16 & -8 & -16 & 0 & 103 & 372 & -3 & 0 & 9 & 91 & -20 & 0 & 0 & 0 & 0 & 0 \\ -12 & -4 & -25 & 0 & 9 & 403 & 61 & 0 & -12 & 107 & -15 & 0 & 0 & 0 & 0 & 0 \\ -8 & -9 & -23 & -5 & -19 & 284 & 229 & -10 & -13 & 69 & 29 & -12 & 0 & 0 & 0 & 0 \\ -8 & -10 & -6 & 0 & 44 & 212 & -16 & 0 & 71 & 269 & -11 & 0 & -11 & -16 & -16 & 0 \\ -4 & -9 & -10 & 0 & -6 & 226 & 52 & 0 & 2 & 272 & 22 & 0 & -6 & -15 & -12 & 0 \\ -2 & -8 & -12 & -2 & -16 & 160 & 100 & -9 & -15 & 213 & 143 & -2 & -9 & -12 & -15 & -2 \end{bmatrix} \begin{bmatrix} a \\ b \\ c \\ d \\ e \\ f \\ g \\ h \\ i \\ j \\ k \\ l \\ m \\ n \\ o \\ p \end{bmatrix}$$

FIG. 6

$$\begin{bmatrix} A \\ B \\ C \\ D \\ E \\ F \\ G \\ H \\ I \\ J \\ K \\ L \\ M \\ N \\ O \\ P \\ Q \\ R \\ S \\ T \\ U \\ V \\ W \\ X \end{bmatrix} = 1/512 \begin{bmatrix}
-7 & 81 & -14 & 0 & 52 & 405 & 24 & 0 & -13 & -2 & -14 & 0 & 0 & 0 & 0 & 0 \\
-6 & 23 & 52 & -12 & -9 & 201 & 302 & -12 & -3 & -5 & -13 & -6 & 0 & 0 & 0 & 0 \\
-8 & 43 & -16 & 0 & 99 & 382 & -9 & 0 & -3 & 38 & -14 & 0 & 0 & 0 & 0 & 0 \\
-10 & 38 & -20 & 0 & 54 & 397 & 27 & 0 & -7 & 49 & -16 & 0 & 0 & 0 & 0 & 0 \\
-13 & 33 & -23 & 0 & 10 & 413 & 62 & 0 & -12 & 59 & -17 & 0 & 0 & 0 & 0 & 0 \\
-12 & 26 & -15 & -3 & -4 & 354 & 142 & -5 & -11 & 48 & -4 & -4 & 0 & 0 & 0 & 0 \\
-10 & 17 & -8 & -7 & -13 & 295 & 221 & -9 & -10 & 36 & 9 & -9 & 0 & 0 & 0 & 0 \\
-5 & 4 & 18 & -11 & -9 & 197 & 302 & -9 & -5 & 17 & 24 & -11 & 0 & 0 & 0 & 0 \\
-14 & -6 & -21 & 0 & 56 & 338 & 29 & 0 & -2 & 99 & -17 & 0 & 0 & 0 & 0 & 0 \\
-10 & -7 & -24 & -3 & -5 & 344 & 145 & -5 & -12 & 88 & 7 & -6 & 0 & 0 & 0 & 0 \\
-4 & -13 & -16 & -11 & -10 & 194 & 301 & -6 & -6 & 39 & 60 & -16 & 0 & 0 & 0 & 0 \\
-12 & -13 & -9 & 0 & 53 & 363 & 26 & 0 & 1 & 111 & -8 & 0 & 0 & 0 & 0 & 0 \\
-9 & -14 & -11 & 0 & 19 & 356 & 67 & 0 & -6 & 109 & 1 & 0 & 0 & 0 & 0 & 0 \\
-9 & -9 & -14 & -2 & -9 & 261 & 195 & -5 & -9 & 74 & 45 & -6 & 0 & 0 & 0 & 0 \\
-12 & -5 & -13 & -4 & -5 & 174 & 282 & -9 & -5 & 42 & 79 & -12 & 0 & 0 & 0 & 0 \\
-6 & -10 & -8 & 0 & 19 & 219 & 18 & 0 & 37 & 271 & 6 & 0 & -9 & -16 & -9 & 0 \\
-8 & -9 & -6 & 1 & -11 & 193 & 76 & -4 & -7 & 243 & 83 & -4 & -4 & -14 & -14 & -1 \\
-1 & -8 & -11 & -4 & -8 & 102 & 156 & -13 & -8 & 142 & 206 & -10 & -1 & -11 & -15 & -4 \\
-4 & -5 & -3 & 0 & 23 & 153 & -16 & 0 & 83 & 330 & -13 & 0 & -13 & -16 & -7 & 0 \\
-3 & -5 & -4 & 0 & 6 & 151 & 0 & 0 & 45 & 338 & 15 & 0 & -11 & -9 & -11 & 0 \\
-2 & -5 & -5 & 0 & -10 & 149 & 15 & 0 & 7 & 347 & 43 & 0 & -9 & -2 & -16 & 0 \\
-2 & -4 & -6 & -1 & -12 & 125 & 35 & -4 & -5 & 304 & 111 & -4 & -6 & -3 & -14 & -2 \\
-1 & -4 & -6 & -1 & -14 & 102 & 55 & -8 & -16 & 260 & 179 & -9 & -4 & -4 & -13 & -4 \\
-1 & -4 & -6 & -2 & -7 & 62 & 104 & -12 & -8 & 172 & 255 & -11 & -2 & -9 & -14 & -5
\end{bmatrix} \begin{bmatrix} a \\ b \\ c \\ d \\ e \\ f \\ g \\ h \\ i \\ j \\ k \\ l \\ m \\ n \\ o \\ p \end{bmatrix}$$

FILTERING CONTROL METHOD FOR IMPROVING IMAGE QUALITY OF BI-LINEAR INTERPOLATED IMAGE

Matter enclosed in heavy brackets [ ] appears in the original patent but forms no part of this reissue specification; matter printed in italics indicates the additions made by reissue.

*CROSS-REFERENCE TO RELATED APPLICATIONS*

*More than one reissue application has been filed for the reissue of U.S. Pat. No. 6,803,954. U.S. patent application Ser. No. 11/546,484 is a reissue of U.S. Pat. No. 6,803,954; U.S. patent application Ser. No. 12/024,408, now abandoned, is a divisional reissue of U.S. Pat. No. 6,803,954; and U.S. patent application Ser. No. 12/424,927 is a continuation reissue of U.S. patent application Ser. No. 11/546,484.*

BACKGROUND OF THE INVENTION

1. Field of the Invention

The present invention relates to an interpolation method adapted to enlargement of a low resolution image when the image digitized through a CCD (Charged-Coupled Device) has the low resolution, in particular to a filtering control method for improving the image quality of a bi-linear interpolated image which is capable of restoring a requested interpolated high resolution image from a low resolution image by finding a coefficient of a two-dimensional filter on the basis of a regularization image restoration method.

2. Description of the Prior Art

In the conventional technology, a still picture or a moving picture has or transmits a low resolution image because it can not physically satisfy a sensor having the low resolution or a nyquist value.

In addition, a compressed moving picture has or transmits the low resolution image due to its bit value problem.

For example, when the compressed moving picture having the low bit value is transmitted to a receiver and the receiver enlarges the transmitted moving picture, the resolution of the transmitted moving picture lowers due to a degradation phenomenon ect.

Accordingly, a method for getting a high resolution image from a low resolution image is required.

In the meantime, the method for getting the high resolution image from the low resolution image is largely divided into an image expansion type method and an image enhancement type method.

First, the image expansion type method converts the size of the low resolution image into a requested size. The bi-linear interpolation method, a zero order expansion method, and a cubic spline method are comprised in the image expansion type method.

However, as described above, the image expansion type method has an image visibility lowering problem because when the image is interpolation-restored by the above-mentioned method such as the bi-linear interpolation method, zero order hold expansion method, cubic spline method, the outlines of the image is over-blurred.

Meanwhile, the image enhancement type method comprises many methods, but the image enhancement type method causes a computational complexity, accordingly the method is not suited to a real-time processing due to the its computational complexity.

In addition, when the image enhancement type method is used for getting the high resolution image from the low resolution image, setting of each parameter is not adaptable.

For example, there is a POCS (Projection Onto Convex Set) method for increasing the resolution of an image. In the POCS method, in use of time region information, it is assumed as correlation between the images is uniformly same, but actually the correlation between the images is not uniform.

In addition, there is a mapping method for mapping a non-uniform sample of the low resolution image into a uniform sample of the high resolution image by using moving information and segmentation information of the image. However, the mapping method has the computational complexity problem, accordingly the mapping method is not suited to the real-time image data processing of the image processing system.

SUMMARY OF THE INVENTION

The object of the present invention is to provide a filtering control method for improving the image quality of a bi-linear interpolated image which is capable of improving the image quality of the interpolated image by using an interpolation method considering a real-time processing, a computational complexity and an efficiency when the digital video system seeks the interpolated image from the low resolution image.

The other object of the present invention is to provide the filtering control method for improving the image quality of the bi-linear interpolated image which is capable of finding a two-dimensional filter coefficient for getting the interpolated image from the low resolution image on the basis of a regularization image restoration method.

The other object of the present invention is to provide the filtering control method for improving the image quality of the bi-linear interpolated image which can approximate and find a PSF (Point Spread Function) for the bi-linear interpolated image from a modeling of the degraded image in the frequency region.

The other object of the present invention is to provide the filtering control method for improving the image quality of the bi-linear interpolated image which is capable of performing a real-time adaptive processing by finding a filter coefficient from the bi-linear interpolated image and approximated PSF.

In the present invention, in order to find a filter coefficient for finding the interpolated image from the low resolution image on the basis of the regularization image restoration method, when H is the PSF (Point Spread Function), f is a requested high resolution image, Z is the low resolution image, g is the high resolution image gotten from the bi-linear interpolation method, an added function $M(f)=\|g-Hf\|^2+\alpha\|Cf\|^2$ for finding the PSF(H) from an equation $g=Bz=Hf+n$ (B, H are bi-linear interpolated filters, n is a noise component generated by the assumed H) is defined.

The filtering control method for improving the image quality of the bi-linear interpolated image can be implemented by finding the PSF(H) from the added function M(f) by using an equation $$H(k, l) = \frac{G(k, l)}{F(k, l)}.$$

The filtering control method for improving the image quality of the bi-linear interpolated image can be implemented by finding a PSF(P) of a f=Pg function by using an equation $$P(k, l) = \frac{H*(k, l)}{H*(k, l)H(k, l) + C*(k, l)C(k, l)}$$

after finding the PSF(H).

The filtering control method for improving the image quality of the bi-linear interpolated image can restore the requested high resolution image(f) by finding an added filter coefficient Q of the PSF(P) and interpolation filter B from the equation f=Pg=PBz=Qz.

BRIEF DESCRIPTION OF THE DRAWINGS

FIG. 1 illustrates an image sample for getting a twice enlarged high resolution image according to the embodiment of the present invention.

FIG. 2 illustrates an interpolation filter coefficient for getting the twice enlarged image according to the embodiment of the present invention.

FIG. 3 illustrates an image sample for getting a three times enlarged high resolution image according to the other embodiment of the present invention.

FIG. 4 illustrates the interpolation filter coefficient for getting the three times enlarged image according to the other embodiment of the present invention.

FIG. 6 illustrates the interpolation filter coefficient for getting the six times enlarged image according to the another embodiment of the present invention.

DETAILED DESCRIPTION OF THE PREFERRED EMBODIMENT

Figure 5:
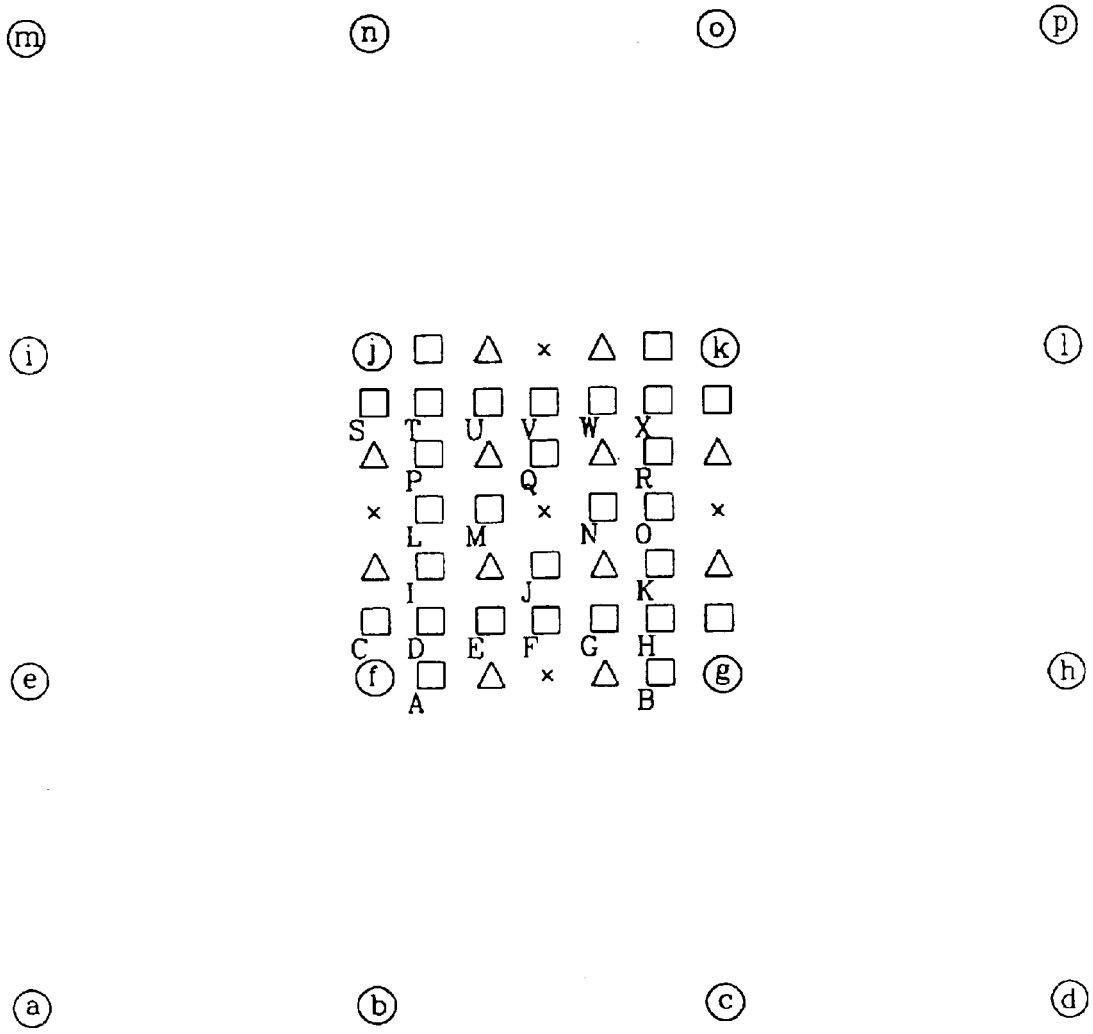
FIG. 5 illustrates an image sample for getting a six times enlarged high resolution image according to the another embodiment of the present invention.

FIG. 1 illustrates an image sample for getting a twice enlarged high resolution image according to the embodiment of the present invention.

As depicted in FIG. 1, a~i illustrate low resolution pixels, A~D illustrate high resolution pixels. In addition, pixels depicted as 'x' illustrate pixels interpolated as twice by a twice interpolation filter coefficient.

FIG. 2 illustrates the interpolation filter coefficient for getting a twice enlarged image according to the embodiment of the present invention. In other words, the interpolation filter coefficient for interpolating the twice enlarged image of FIG. 1 is depicted in FIG. 2.

As depicted in FIG. 2, the high resolution image is gotten from the low resolution pixels a~i (3×3 pixels) inside of a circle of FIG. 1 by using the interpolation filter coefficient.

FIG. 3 illustrates an image sample for getting a three times enlarged high resolution image according to the other embodiment of the present invention.

As depicted in FIG. 3, a~p illustrate the low resolution pixels, A~I illustrate the high resolution pixels using the filter according to the present invention.

FIG. 4 illustrates the interpolation filter coefficient for getting the three times enlarged image according to the other embodiment of the present invention.

As depicted in FIG. 4, three times enlarged pixels which are newly generated illustrated as triangles in FIG. 3 are gotten from the low resolution pixels a~p (4×4 pixels) by using the interpolation filter coefficient of FIG. 4.

FIG. 5 illustrates the image sample for getting a six times enlarged high resolution image according to the another embodiment of the present invention. In other words, it illustrates the image sample for getting the six times enlarged high resolution image from the twice and three times interpolation filter coefficients by using the bi-linear interpolation method.

As depicted in FIG. 5, pixels illustrated as a 'X' can be gotten by using the twice interpolation filter of FIG. 2, and pixels illustrated as a triangle can be gotten by using the three times interpolation filter coefficient of FIG. 4.

In addition, pixels illustrated as a quadrilateral can be gotten from the pixels generated by the twice and three times interpolation filter coefficients by using the bi-linear interpolation method.

FIG. 6 illustrates the interpolation filter coefficient for getting the six times enlarged image according to the another embodiment of the present invention. In other words, the interpolation filter coefficient for getting the six times enlarged image of FIG. 5 is depicted in FIG. 6.

Meanwhile, as depicted in FIG. 2, FIG. 4 and FIG. 6, the value found by using the interpolation filter coefficient of the present invention has an integer value.

In addition, a 9 bit shift is performed to the value calculated by the interpolation filter coefficient, accordingly there is no need to perform a floating point operation processing.

The twice, three times, six times interpolated images are depicted in FIG. 1~FIG. 6, however the present invention is not limited by that, it can be adapted freely to a certain interpolation value.

Hereinafter, the filtering control method for improving the image quality of the bi-linear interpolated image will be described in more detail.

First, a spatially invariant PSF (Point Spread Function) for finding the interpolation filter coefficient according to the each interpolation value can be easily analyzed and approximated in the frequency region, accordingly the spatially invariant PSF (Point Spread Function) is considered from the bi-linear interpolated image.

After that, when it is assumed as the low resolution image is z, high resolution image gotten by the bi-linear interpolation method is g, high resolution image to be restored is f, the relation between the each image can be described as below.

$$g=Bz=Hf+n \qquad \text{[Equation 1]}$$

Herein, the B, H, n are the bi-linear interpolation filters, H is the spatially invariant PSF defining the relation between the original high resolution image and high resolution image gotten by the interpolation method, and the n is a noise component generated by the assumed H.

Herein, when the noise component is neglected and a direct inverse is used in order to find the PSF(H), the PSF(H) can be described as below equation 2 in the frequency region.

$$H(k, l) = \frac{G(k, l)}{F(k, l)}. \qquad \text{[Equation 2]}$$

Herein, the H(k,l) is the component in the k,l frequency region of the PSF(H), the G (k,l) is the component in the k,l frequency region of the bi-linear interpolated image. In addition, the F (k,l) is the component in the k,l frequency region of the high resolution image.

Meanwhile, the high resolution image f to be restored is unknown, the PSF(H) can be gotten from the bi-linear interpolated high resolution image through a statistical processing after performing an under-sample processing of various images as various value.

Herein, the high resolution image is gotten by using the PSF(H) found from the direct inverse. In other words, there is a system stabilization problem because the high resolution image gotten from the PSF(H) by using the direct inverse is overshoot in the region where the k,l have '0' value (in general, high frequency region) in the frequency region, accordingly the regularization image restoration for improving the system stabilization is used to solve the problem.

The regularization image restoration method is used for restoring the image or finding a certain PSF, an added function M(f) for finding the PSF(H) by using the regularization image restoration method can be described as below equation 3.

$$M(f)=\|g-Hf\|^2+\alpha\|Cf\|^2 \quad \text{[Equation 3]}$$

Herein, the first term of the right side of Equation 3 illustrates the credibility of the bi-linear interpolated image, the second term of the right side illustrates increase of the stability of the system by providing the mitigation to the restored image.

In addition, the ||.|| means a norm, the α is a regularization parameter for determining the credibility and mitigation of the original image. In addition, the C is the two-dimensional high frequency filter for determining the mitigation of the original image, in the present invention a two-dimensional Gaussian filter is used as the C.

When a gradient operator is adapted to Equation 3 in order to get the high resolution image, it can be described as below equation 4.

$$\square_f M(f)=-2H^T(g-Hf)+2\alpha C^T Cf=0 \quad \text{[Equation 4]}$$

Herein, the T means a transpose of a matrix.

Meanwhile, conventionally a repetition method is used in order to get the high resolution image and regularization parameter, but it is not suited to the moving picture processing because the method causes lots of computational complexity.

Accordingly, in the present invention, the regularization parameter α is fixed as '1', and the high resolution image f can be found as below equation 5.

$$f = \frac{H^T g}{(H^T H + C^T C)} = Pg \quad \text{[Equation 5]}$$

When the PSF(P) is found by Equation 5, PSF(P)=H/($H^T H+C^T C$) requires the lots of computational complexity for calculating an inverse matrix, however the PSF(P) in Equation 5 is a block-circulant matrix, accordingly it can be easily calculated in the frequency region.

Accordingly, the PSF(P) can be found finally as below Equation 6.

$$P(k, l) = \frac{H*(k, l)}{H*(k, l)H(k, l) + C*(k, l)C(k, l)} \quad \text{[Equation 6]}$$

Herein, the '*' means a complex-conjugate.

The PSF(P) can be found by using an IFT (Inverse Fourier Transform) from Equation 6.

The requested high resolution image f can be found as below Equation 7 by using the found PSF(P) and Equation 1.

$$f=Pg=PBz=Qz \quad \text{[Equation 7]}$$

The PSF(P) is the spatially invariant function, the bi-linear interpolation filter B can be easily found by the conventional technology, accordingly the added filter coefficient Q of the PSF(P) and bi-linear interpolation filter B can be found.

Herein, in order to reduce the computational complexity, the number of a kernel of the PSF(P) is set in accordance with the up-sampling value.

When the up-sampling value is 2 in the present invention, the number of the kernel is limited as 3, when the up-sampling value is 3, the number of the kernel is limited as 4.

When the up-sampling value is 2, it can be used in an application segment for enlarging the size of the image as twice at a post processor of the compressed digital image and in finding of a sub-pixel moving vector in a H.263 moving picture compressed method.

In addition, when the up-sampling value is 3, it can be used in using of a ⅓ unit moving vector in a H.26L moving picture compressed method.

Herein, the H.263 and H.26L are moving picture compressed standards presented in the ITU-T (International Telecommunications Union-Telecommunication).

As described above, the present invention can be used for improving the image quality at the post processor of the compressed digital image by using the interpolation method for getting the interpolated high resolution image from the low resolution image when the resolution of the digital image lowers due to the low resolution image sensor.

In addition, the interpolation method of the present invention can improve the image quality by finding the moving vector of the moving picture compressed type.

What is claimed is:

1. A filtering control method for improving the image quality of a bi-linear interpolated image when recovering a high resolution image from a low resolution image, *the method* comprising *performing operations using at least one processor, the operations comprising*:

restoring a requested high resolution image f by finding an added filter coefficient Q of a PSF(P) and a bi-linear interpolation filter B from an equation f=Pg=PBz=Qz, wherein f is the high resolution image as requested, P is the PSF (Point Spread Function), g is the high resolution image found by the bi-linear interpolation method, and z is the low resolution image;

wherein the high resolution image f can be restored by performing an added function M(f) definition process for finding the PSF(H) from an equation g=Bz=Hf+n, wherein B, H are bi-linear interpolation filters, and n is a noise component generated by the assumed H; and wherein the added function M(f) is defined as $M(f)=\|g-Hf\|^2+\alpha\|Cf\|^2$, wherein α is a regularization parameter, and C is a two-dimensional high frequency filter for finding mitigation of the original image.

2. The filtering control method for improving the image quality of the bi-linear interpolated image according to claim 1, wherein the regularization parameter α is fixed as '1' in order to reduce a computational complexity.

3. The filtering control method for improving image quality of the b-linear interpolated image according to claim 1, wherein a two-dimensional gaussian filter is used as the two-dimensional high frequency filer C in order to determine the mitigation of the original image.

4. A filtering control method for improving the image quality of a bi-linear interpolated image when recovering a high resolution image from a low resolution image, *the method comprising performing operations using at least one processor, the operations comprising*:

restoring a requested high resolution image f by finding an added filter coefficient Q of a PSF(P) and a bi-linear interpolation filter B from an equation f=Pg=PBz=Qz, wherein f is the high resolution image as requested, P is the PSF (Point Spread Function), g is the high resolution image found by the bi-linear interpolation method, and z is the low resolution image;

wherein the high resolution image f can be restored by performing an added function M(f) definition process for finding the PSF(H) from an equation g=Bz=Hf+n, wherein B, H are bi-linear interpolation filters, and n is a noise component generated by the assumed H;

wherein the high resolution image f is restored by finding a PSF(P) of a f=Pg function after finding the PSF(H) from the added function M(f); and wherein the PSF(H) is found by using an equation $$H(k, l) = \frac{G(k, l)}{F(k, l)},$$

G(k,l) is the component in the k,l frequency region of the bi-linear interpolated image, and F(k,l) is the component in the k,l frequency region of the high resolution image.

5. A filtering control method for improving the image quality of a bi-linear interpolated image when recovering a high resolution image from a low resolution image, *the method comprising performing operations using at least one processor, the operations comprising*:

restoring a requested high resolution image f by finding an added filter coefficient Q of a PSF(P) and a bi-linear interpolation filter B from an equation f=Pg=PBz=Qz, wherein f is the high resolution image as requested, P is the PSF (Point Spread Function), g is the high resolution image found by the bi-linear interpolation method, and z is the low resolution image;

wherein the PSF(P) can be found by getting an IFT (Inverse Fourier Transform) by an equation $$P(k, l) = \frac{H*(k, l)}{H*(k, l)H(k, l) + C*(k, l)C(k, l)}.$$

*H(k,l) is a component in the k,l frequency region of the PSF(H), and C is a two-dimensional high frequency filter.*

6. The filtering control method for improving the image quality of the bi-linear interpolated image according to claim 5, wherein the number of a kernal of the PSF(P) is set in accordance with an up-sampling value of the image.

7. A filtering control method for improving the image quality of a bi-linear interpolated image when recovering a high resolution image from a low resolution image, *the method comprising performing operations using at least one processor the operations comprising*:

defining an added function M(f) for finding a PSF(H) from an equation g=Bz=Hf+n (wherein B, H are bi-linear filters, n is a noise component generated by an assumed H when the H is a PSF (Point Spread Function), f is a requested high resolution image, z is a low resolution image, and g is a high resolution image gotten by the bi-linear interpolation method);

finding a PSF(P) of a f=Pg function after finding the PSF (H) from the defined added function M(f); and restoring the requested high resolution image f by finding an added filter coefficient Q of the PSF(P) and interpolation filter B from the equation f=Pg=PBZ=Qz;

wherein the added function M(f) is defined as $M(f)=\|g-Hf\|^2+\alpha\|Cf\|^2$, wherein $\alpha$ is a regularization parameter, and C is a two-dimensional high frequency filter for finding the mitigation of the original image.

8. The filtering control method for improving the image quality a of the bi-linear interpolated image according to claim 7, wherein the regularization parameter $\alpha$ is fixed as '1' in order to reduce a computational complexity.

9. The filtering control method for improving image quality of the bi-linear interpolated image according to claim 7, wherein a two-dimensional gaussian filter is used as the two-dimensional high frequency filter C in order to determine the mitigation of the original image.

10. A filtering control method for improving the image quality of a bi-linear interpolated image when recovering a high resolution image from a low resolution image, *the method comprising performing operations using at least one processor the operations comprising*:

defining an added function M(f) for finding a PSF(H) from an equation g=Bz=Hf+n (wherein B, H are bi-linear filters, n is a noise component generated by an assumed H when the H is a PSF (Point Spread Function), f is a requested high resolution image, z is a low resolution image, and g is a high resolution image gotten by the bi-linear interpolation method);

finding a PSF(P) of a f=Pg function after finding the PSF (H) from the defined added function M(f); and restoring the requested high resolution image f by finding an added filter coefficient Q of the PSF(P) and interpolation filter B from the equation f=Pg=PBZ=Qz;

wherein the PSF(H) is found by an equation $$H(k,l)=(G(k,l)/F(-k,l),$$

wherein G(k,l) is the component in the k,l frequency region of the bi-linear interpolated image, and F(k,l) is the component in the k,l frequency region of the high resolution image.

11. A filtering control method for improving the image quality of a bi-linear interpolated image when recovering a high resolution image from a low resolution image, *the method comprising performing operations using at least one processor, the operations comprising*:

defining an added function M(f) for finding a PSF(H) from an equation g=Bz=Hf+n (wherein B, H are bi-linear filters, n is a noise component generated by an assumed H when the H is a PSF (Point Spread Function), f is a requested high resolution image, z is a low resolution image, and g is a high resolution image gotten by the bi-linear interpolation method);

finding a PSF(P) of a f=Pg function after finding the PSF (H) from the defined added function M(f); and restoring the requested high resolution image f by finding an added filter coefficient Q of the PSF(P) and interpolation filter B from the equation f=Pg=PBZ=Qz;

wherein the PSF(P) is found by using an IFT (Inverse Fourier Transform) by an equation $$P(k, l) = \frac{H*(k, l)}{H*(k, l)H(k, l) + C*(k, l)C(k, l)}.$$

*H(k,l) is a component in the k,l frequency region of the PSF(H), and C is a two-dimensional high frequency filter.*

12. The filtering control method for improving the image quality of the bi-linear interpolated image according to claim 11, wherein the number of a kernal of the PSF(P) is differently set in accordance with an up-sampling value of the image.

*13. A method for generating an interpolated pixel data, the method comprising generating a set of the interpolated pixel data from a set of original pixel data from an original image, wherein interpolated pixel data for a particular pixel is generated by performing operations using at least one processor, the operations comprising:*

*selecting original pixel data for more than three pixels of the original image;*

*obtaining at least a first filter coefficient and a second filter coefficient, the first filter coefficient and the second filter coefficient being configured to interpolate the original pixel data;*

*applying the first filter coefficient to the selected original pixel data to produce first interpolated pixel data, the first filter coefficient including weighting factors having at least three different numerical values, wherein applying the first filter coefficient to the selected original pixel data comprises:*

*multiplying each of the weighting factors and the selected original pixel data to produce weighted pixel data, and*

*summing the weighted pixel data to produce the first interpolated pixel data;*

*multiplying the second filter coefficient and the first interpolated pixel data to produce second interpolated pixel data; and*

*identifying the interpolated pixel data as the second interpolated pixel data.*

*14. The method of claim 13, wherein the second filter coefficient is a matrix that includes one or more individual numeric values.*

*15. The method of claim 13, wherein the first filter coefficient and the second filter coefficient each comprise at least one integer value.*

*16. The method of claim 13, wherein a value of the first filter coefficient and a value of the second filter coefficient are one.*

*17. The method of claim 13, wherein a value of the second filter coefficient is one.*

*18. The method of claim 13, wherein the original image is obtained from a low-resolution imaging system.*

*19. The method of claim 13, wherein the second filter coefficient is a point spread function (P) and the first filter coefficient is a bi-linear interpolation filter (B).*

* * * * *